US012560803B2

(12) United States Patent
Yamamoto et al.

(10) Patent No.: US 12,560,803 B2
(45) Date of Patent: Feb. 24, 2026

(54) OPTICAL SCANNING DEVICE AND MANUFACTURING METHOD

(71) Applicant: STANLEY ELECTRIC CO., LTD., Tokyo (JP)

(72) Inventors: Atsushi Yamamoto, Tokyo (JP);
Makoto Sakurai, Tokyo (JP);
Yoshifumi Takao, Tokyo (JP);
Katsunori Nakazawa, Tokyo (JP);
Naoya Matsumaru, Tokyo (JP);
Nazirul Afham Idris, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 310 days.

(21) Appl. No.: 18/290,291

(22) PCT Filed: Apr. 18, 2022

(86) PCT No.: PCT/JP2022/018040
§ 371 (c)(1),
(2) Date: Nov. 11, 2023

(87) PCT Pub. No.: WO2022/239606
PCT Pub. Date: Nov. 17, 2022

(65) Prior Publication Data
US 2024/0231077 A1 Jul. 11, 2024

(30) Foreign Application Priority Data
May 13, 2021 (JP) ................................. 2021-081873

(51) Int. Cl.
*G02B 26/10* (2006.01)
*G02B 26/08* (2006.01)

(52) U.S. Cl.
CPC ......... *G02B 26/10* (2013.01); *G02B 26/0833* (2013.01)

(58) Field of Classification Search
None
See application file for complete search history.

(56) References Cited

U.S. PATENT DOCUMENTS

| | | |
|---|---|---|
| 5,347,121 A | 9/1994 | Rudeen |
| 6,002,507 A | 12/1999 | Floyd et al. |
| | (Continued) | |

FOREIGN PATENT DOCUMENTS

| | | |
|---|---|---|
| CN | 109437088 A | 3/2019 |
| JP | 2006194973 A | 7/2006 |
| | (Continued) | |

OTHER PUBLICATIONS

International Search Report (ISR) (and English translation thereof) dated Jun. 21, 2022, issued in International Application No. PCT/JP2022/018040.

(Continued)

*Primary Examiner* — Dung T Nguyen
(74) *Attorney, Agent, or Firm* — Holtz, Holtz & Volek PC

(57) ABSTRACT

An optical scanning device includes a VCSEL and an emission unit mounted on the same substrate, and a bottom plate portion arranged on the lower side of the substrate. A columnar protruding portion has a tapered shape and is plastically deformable, and is fixed to the bottom plate portion. The columnar protruding portion has a distal end side inserted into a through hole portion of the substrate. At least one of an upper portion of the columnar protruding portion and the through hole portion is plastically deformed so that they are fitted to each other. A relative inclination angle between the substrate and the bottom plate portion is defined by a fitting angle between the through hole portion and the columnar protruding portion.

7 Claims, 13 Drawing Sheets

(56)　　　　　References Cited

U.S. PATENT DOCUMENTS

| | | | |
|---|---|---|---|
| 6,014,240 | A | 1/2000 | Floyd et al. |
| 6,715,685 | B2 | 4/2004 | Dvorkis |
| 7,206,109 | B2 * | 4/2007 | Hayakawa ........... G02B 7/1821 |
| | | | 359/213.1 |
| 7,428,995 | B1 | 9/2008 | Stern et al. |
| 8,228,608 | B2 | 7/2012 | Yamamoto |
| 9,097,895 | B2 | 8/2015 | Ikegami |
| 10,341,607 | B2 | 7/2019 | Komatsu et al. |
| 2002/0170967 | A1 | 11/2002 | Dvorkis |
| 2004/0240205 | A1 | 12/2004 | Hayakawa et al. |
| 2008/0049289 | A1 | 2/2008 | Urakawa et al. |
| 2009/0231687 | A1 | 9/2009 | Yamamoto |
| 2010/0149073 | A1 | 6/2010 | Chaum et al. |
| 2011/0211260 | A1 | 9/2011 | Yamamoto |
| 2012/0300276 | A1 | 11/2012 | Ohnishi |
| 2014/0146394 | A1 | 5/2014 | Tout et al. |
| 2019/0004325 | A1 | 1/2019 | Connor |
| 2019/0353897 | A1 | 11/2019 | Suzuki et al. |
| 2019/0370450 | A1 | 12/2019 | Fletcher et al. |
| 2024/0103263 | A1 * | 3/2024 | Sakurai .............. G02B 26/0833 |

FOREIGN PATENT DOCUMENTS

| | | | |
|---|---|---|---|
| JP | 2009244869 | A | 10/2009 |
| JP | 2010117542 | A | 5/2010 |
| JP | 2010175677 | A | 8/2010 |
| JP | 2012208157 | A | 10/2012 |
| JP | 2013029700 | A | 2/2013 |
| JP | 2013046143 | A | 3/2013 |
| JP | 2014056020 | A | 3/2014 |
| JP | 2015022158 | A | 2/2015 |
| JP | 2017207630 | A | 11/2017 |
| JP | 2018116219 | A | 7/2018 |
| JP | 2019211705 | A | 12/2019 |
| JP | 6734532 | B2 | 7/2020 |
| KR | 100648929 | B1 | 11/2006 |
| WO | 03019463 | A1 | 3/2003 |

OTHER PUBLICATIONS

Written Opinion dated Jun. 21, 2022, issued in International Application No. PCT/JP2022/018040.

Notice of Allowance dated Aug. 27, 2025, issued in related U.S. Appl. No. 18/273,457.

Office Action (Non-Final Rejection) dated Aug. 26, 2025, issued in related U.S. Appl. No. 18/277,084.

Supplementary European Search Report (SESR) dated Nov. 26, 2024, issued in European Application No. 22804485.5 (which is a counterpart of related U.S. Appl. No. 18/562,009).

International Search Report (ISR) (and English translation thereof) dated Apr. 12, 2022, issued in International Application No. PCT/JP2022/002452.

Related U.S. Appl. No. 18/273,457, First Named Inventor: Makato Sakurai; Title: "Optical Scanning Device"; filed Jul. 20, 2023.

Related U.S. Appl. No. 18/277,084, First Named Inventor: Makato Sakurai; Title: "Eyeglass-Type Video Display Device"; filed Aug. 14, 2023.

Related U.S. Appl. No. 18/562,009, First Named Inventor: Yoshifumi Takao; Title: "Optical Scanning Device"; filed Nov. 17, 2023.

Written Opinion dated Apr. 12, 2022, issued in International Application No. PCT/JP2022/002452.

International Search Report (ISR) (and an English language translation thereof) dated Jul. 5, 2022, issued in International Application No. PCT/JP2022/018037.

International Search Report (ISR) (and and English language translation thereof) dated Apr. 12, 2022, issued in International Application No. PCT/JP2022/002450.

Written Opinion dated Apr. 12, 2022, issued in International Application No. PCT/JP2022/002450.

Written Opinion dated Jul. 5, 2022, issued in International Application No. PCT/JP2022/018037.

Office Action (Non-Final Rejection) dated Oct. 30, 2025, issued in related U.S. Appl. No. 18/562,009.

* cited by examiner

OPTICAL SCANNING DEVICE AND MANUFACTURING METHOD

TECHNICAL FIELD

The present invention relates to an optical scanning device having a MEMS optical deflector and a manufacturing method thereof.

BACKGROUND ART

Patent Literature 1 discloses an optical scanning device having a MEMS optical deflector. The optical scanning device is attached to a temple (side support) on one side of a spectacles-type head mount and emits scanning light from the MEMS optical deflector toward lenses and half mirrors arranged toward the front (front frame) of the spectacles.

According to the schematic diagram of Patent Literature 1, the lens and the half mirror are mounted on the temple in addition to the optical scanning device, and the optical scanning device faces the half mirror with the lens interposed therebetween. Laser light emitted from the optical scanning device scans on the half mirror along the mirror surface thereof, is reflected by the mirror surface, and projects an image onto the retina of a user's eye.

CITATION LIST

Patent Literature

Patent Literature 1: Japanese Patent No. 6734532

SUMMARY OF INVENTION

Technical Problem

Patent Literature 1 does not disclose in what positional relationship, the light source, the MEMS optical deflector, and the substrate are mounted in the optical scanning device specifically.

In the previous Japanese Patent Application No. 2021-026244 (hereinafter referred to as "prior application"), the applicant discloses an optical scanning device which mounts a light source emitting a light beam and a MEMS optical deflector incident with the light beam from the light source on the same substrate, and generates by optical elements, an optical path causing light emitted from the light source to enter a rotating mirror of the MEMS optical deflector. According to the optical scanning device, the distance between both of the light source and the MEMS optical deflector can be reduced by mounting both on the same substrate, and the optical scanning device can be significantly downsized.

When the light source and the MEMS optical deflector are mounted on the same substrate, the optical elements (e.g., mirrors) which generate the optical path of the light beam from the light source to the MEMS optical deflector need to accurately adjust the inclination angle relative to the optical path, but there is a limit to the range in which the inclination angle can be adjusted. On the other hand, the light source is mounted on the substrate so that the emission direction becomes a predetermined direction (e.g., a direction perpendicular to the substrate), but a deviation will occur.

When the deviation becomes large, it becomes difficult to deal with it by adjusting the inclination angle of the optical element.

An object of the present invention is to provide an optical scanning device and a manufacturing method thereof which, even if the direction of emission of a light beam from a light source deviates and the light source is mounted on a substrate, can compensate for the deviation.

Solution to Problem

There is provided an optical scanning device of the present invention which includes:

a substrate having at least one through hole portion, a light source and a MEMS optical deflector mounted on the substrate, an optical element generating an optical path which causes a light beam emitted from the light source to enter the MEMS optical deflector, a bottom plate arranged below the substrate, and a columnar protruding portion having a lower end larger in size than a through hole of the through hole portion and fixed to an upper surface of the bottom plate in a shape tapered toward a tip of the columnar protruding portion, and having an upper portion fitted into the through hole portion, and in which at least one of the upper portion of the columnar protruding portion and the through hole portion is plastically deformed so that the two are fitted to each other, and in which a relative inclination angle between the substrate and the bottom plate is defined by a fitting angle between the through hole portion and the columnar protruding portion.

There is provided a method for manufacturing an optical scanning device of the present invention, including:

an arrangement step of arranging a bottom plate having a columnar protruding portion tapered toward an upper end of the columnar protruding portion, which is fixed to an upper surface of the bottom plate in association with each through hole, on the lower side of a substrate having at least one through hole portion and mounted on the upper surface side of the substrate with a light source and a MEMS optical deflector, an insertion step of inserting each columnar protruding portion of the bottom plate into each through hole of the substrate from below, an irradiation step of turning on the light source and generating an irradiation point of a light beam emitted from the light source on a predetermined screen, an adjustment step of plastically deforming at least one of the through hole portion and the columnar protruding portion to adjust a relative inclination angle between the substrate and the bottom plate so that the irradiation point falls inside a predetermined area on the screen, and a step of, when the irradiation point falls inside a predetermined area on the screen, fixing the substrate to the bottom plate at a relative inclination angle at that time.

Advantageous Effects of Invention

According to the present invention, a relative inclination angle between a bottom plate and a substrate is defined by a fitting angle at which at least one of a through hole portion of the substrate and a columnar protruding portion is fitted by plastic deformation so that the relative inclination angle becomes appropriate. As a result, even if the direction of emission of a light beam from a light source deviates and the light source is mounted on the substrate, it is possible to compensate for the deviation.

DESCRIPTION OF EMBODIMENTS

Figure 1A:
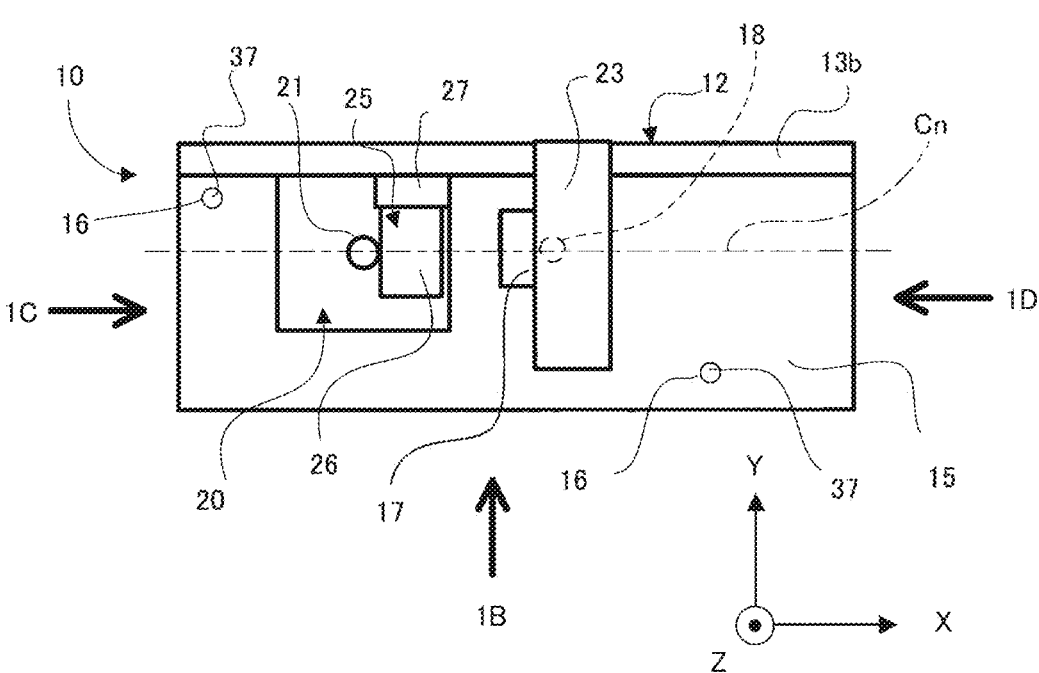
FIG. 1A is a plan view of an optical scanning device.

A plurality of preferred embodiments of the present invention will be described in detail with reference to the drawings. It goes without saying that the present invention is not limited to the following embodiments. In addition to the following embodiments, the present invention includes various configuration modes within the scope of the technical idea of the present invention. The same reference numerals are attached to the same elements through all the drawings.

(Configuration)

Figure 1B:
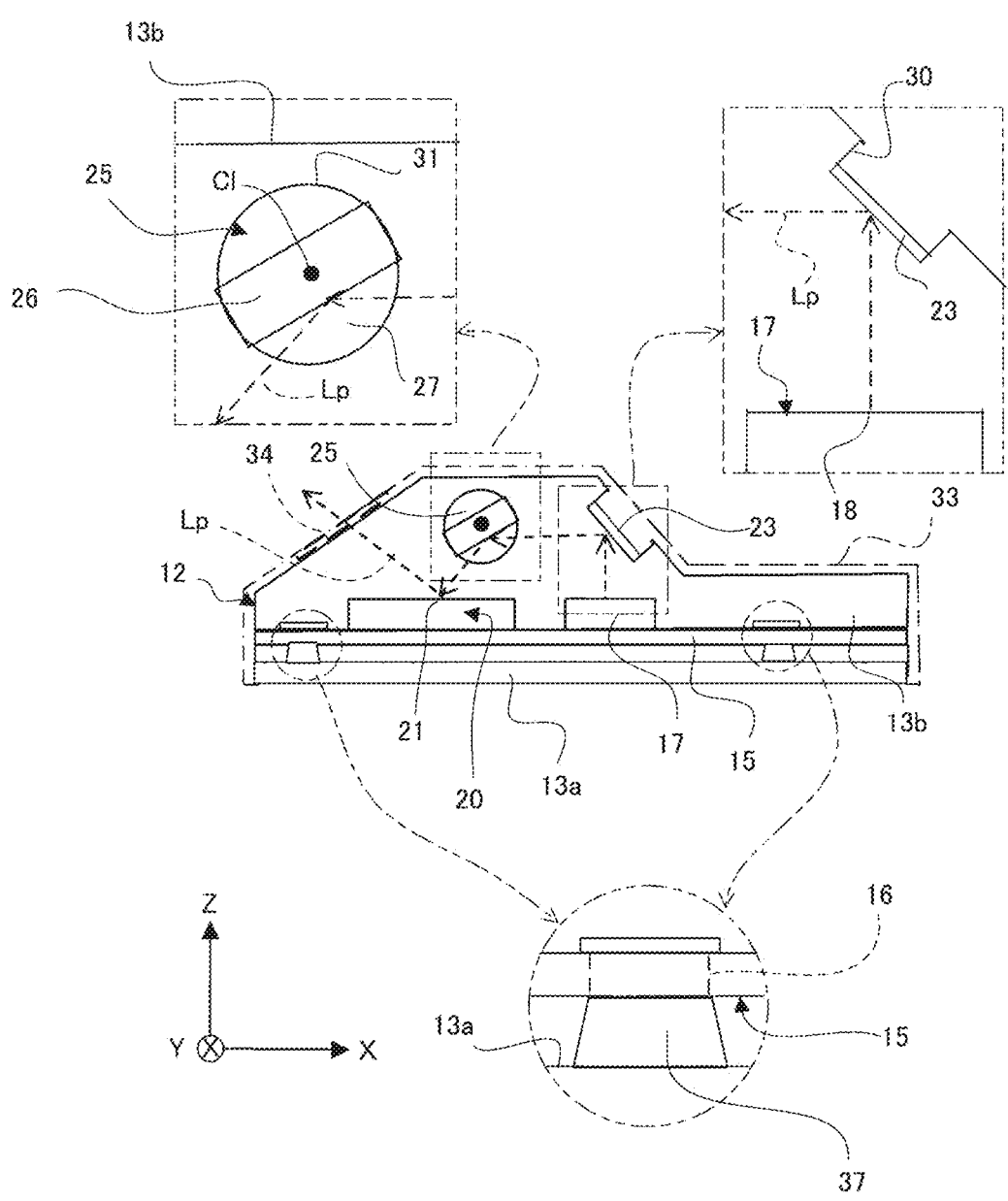
FIG. 1B is a view taken along arrow 1B in FIG. 1A.
Figure 1C:
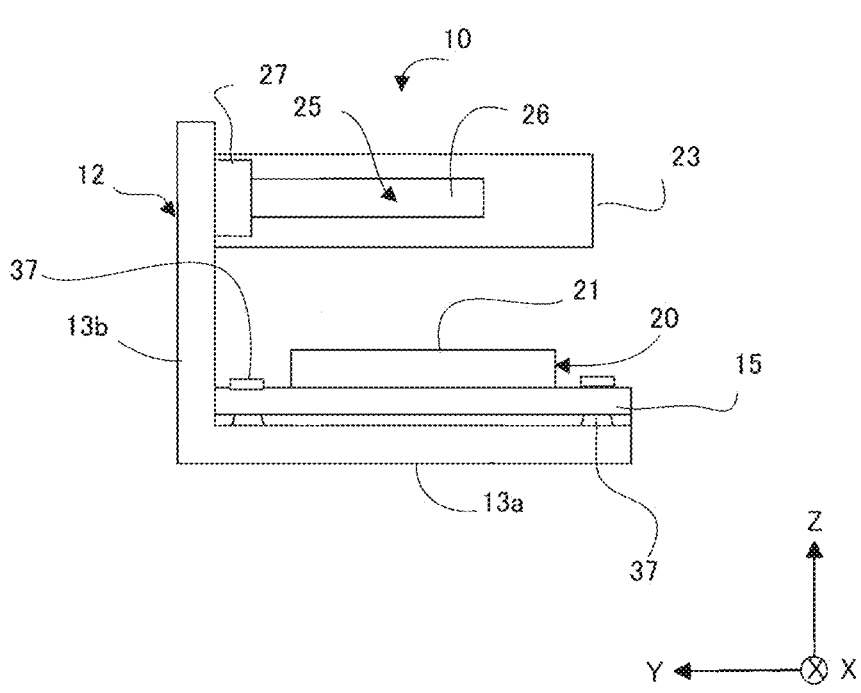
FIG. 1C is a view taken along arrow 1C in FIG. 1A.
Figure 1D:
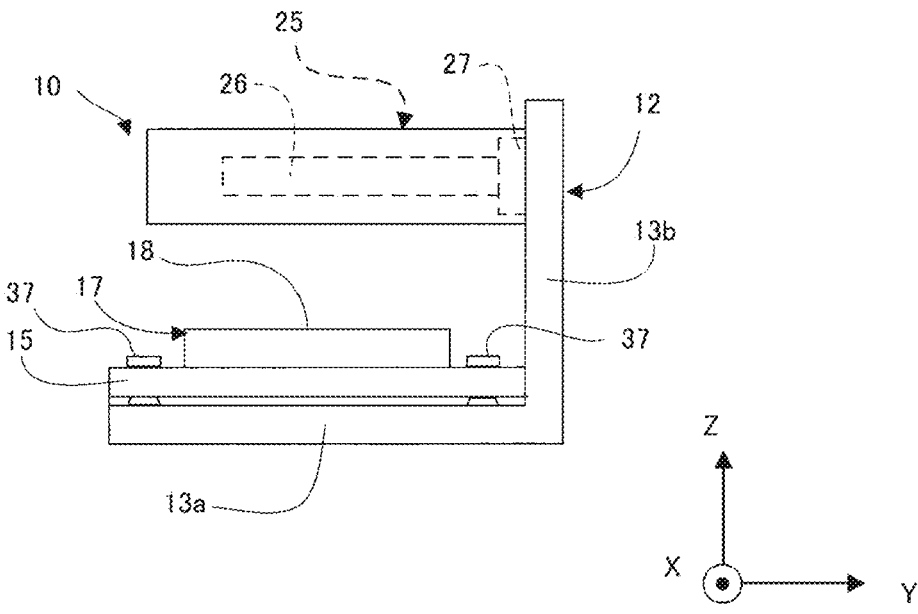
FIG. 1D is a view taken along arrow 1D in FIG. 1A.

FIG. 1A is a plan view of an optical scanning device 10, FIG. 1B is a view taken along arrow 1B in FIG. 1A, FIG. 1C is a view taken along arrow 1C in FIG. 1A, and FIG. 1D is a view taken along arrow 1D in FIG. 1A. Incidentally, FIGS. 1A to 1D show the optical scanning device 10 with a cover 33 (one-dot chain line in FIG. 1B) removed.

The optical scanning device 10 includes a support frame body 12. The support frame body 12 has an L-shaped cross-sectional contour, and has a bottom plate portion 13a and an uprising plate portion 13b which are vertically connected. A substrate 15 is rectangular and fixed to an upper surface of the bottom plate portion 13a through a columnar protruding portion 37 interposed therebetween.

For convenience of description, a three-axis orthogonal coordinate system is defined. An X-axis and a Y-axis are defined as axes in the directions parallel to the longitudinal direction (direction parallel to the long side) and the lateral direction (direction parallel to the short side) of the substrate 15, respectively. A Z-axis is defined as an axis parallel to the uprising direction of the uprising plate portion 13b from the substrate 15.

In the optical scanning device 10, scanning light is emitted from the left side of FIG. 1B, i.e., from the negative end of the optical scanning device 10 in the X-axis direction. Therefore, in the X-axis, the negative side and the positive side will be appropriately referred to as the front and rear of the optical scanning device 10, respectively. Further, since the positive side and the negative side in the Z-axis direction are respectively taken as an upper surface and a lower surface in the substrate 15, the positive side and the negative side in the Z-axis direction will be appropriately defined as above and below the optical scanning device 10.

A VCSEL 17 and a MEMS optical deflector 20 are mounted on the upper surface of the substrate 15 with the X-axis direction as an arrangement direction. The VCSEL 17 has an emission unit 18 on its upper surface and emits laser light upward in parallel to the Z-axis direction from the emission unit 18. The MEMS optical deflector 20 directs a mirror surface of a rotating mirror 21 upward in the Z-axis direction.

Incidentally, in FIG. 1A, Cn indicates a straight line including a line segment connecting the emission unit 18 as the center of the VCSEL 17 and the center of the MEMS optical defector 20 when viewed from the top of the substrate 15 (also viewing the substrate 15 in plan). Hereafter, this straight line will be referred to as a "center line Cn" as appropriate.

Incidentally, although the MEMS optical deflector 20 is a two-dimensional scanning MEMS optical deflector in the present embodiment, it may be a one-dimensional scanning MEMS optical deflector. The configuration of the MEMS optical deflector itself is known in various ways. For example, the MEMS optical deflectors described in Japanese Patent Application Laid-Open No. 2017-207630 (two-dimensional scanning MEMS optical deflector) and Japanese Patent Application Laid-Open No. 2014-056020 (one-dimensional scanning MEMS optical deflector) are selected.

The substrate 15 has two through hole portions 16 (FIG. 1A). Each through hole portion 16 penetrates the substrate 15 in its thickness direction and is circular in cross section. A specific positional relationship of the plurality of through hole portions 16 in the substrate 15 will be described later.

Figure 2A:
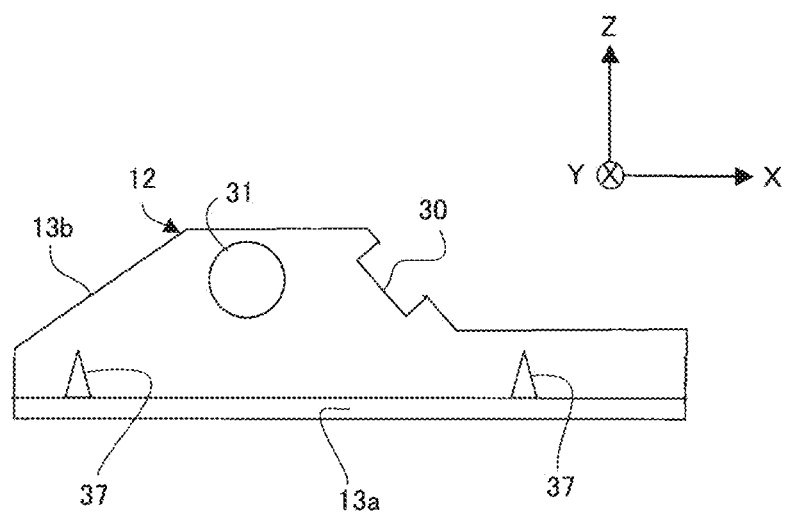
FIG. 2A is a side view of a support frame body.
Figure 2B:
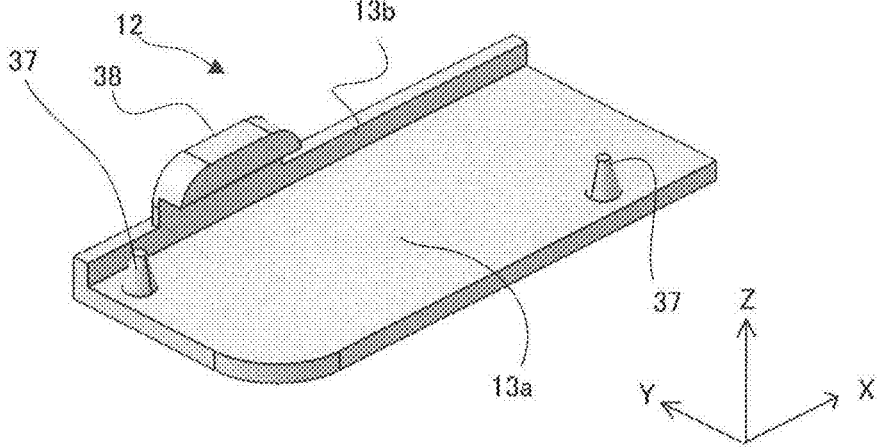
FIG. 2B is a perspective view of the support frame body.

FIG. 2A is a side view of a support frame body 12, and FIG. 2B is a perspective view of the support frame body 12. The configuration of the support frame body 12 will be described with reference to FIGS. 1A to 1D and FIGS. 2A and 2B.

The uprising plate portion 13b of the support frame body 12 has an inclined groove 30 and a through hole 31. The inclined groove 30 has a rectangular cross section and opens obliquely rearward upward along the side contour of the uprising plate portion 13*b*. A bottom surface of the inclined groove 30 is formed of an inclination surface inclined at 45° with respect to the substrate 15. The through hole 31 is formed as a cylindrical hole penetrating through the uprising plate portion 13*b* in the Y-axis direction.

Incidentally, the support frame body 12 of FIG. 2B is modified in structure of the uprising plate portion 13*b* from the support frame body 12 shown in each of FIGS. 1A to 1D and FIG. 2A. Specifically, the support frame body 12 of FIG. 2B is provided with a side protruding portion 38 which protrudes sideways, i.e., toward the bottom plate portion 13*a* at the maximum height portion of the uprising plate portion 13*b*. The top surface of the side protruding portion 38 contacts an inner surface of a ceiling portion of the cover 33 (FIG. 1B) and holds the cover 33.

Two columnar protruding portions 37 are fixed to the upper surface of the bottom plate portion 13*a*. Each columnar protruding portion 37 is set at a position where it can be inserted into the corresponding through hole portion 16 when the substrate 15 is placed on the bottom plate portion 13*a*. The columnar protruding portion 37 has a shape which tapers toward its tip and is formed in a conical shape, for example.

Description will be made about a plate-like mirror 23 and a rotary type mirror 25. In the X-axis direction, the center of the width (length in side view in FIG. 1B) of the inclination surface (bottom surface) of the inclined groove 30 is located at the same position as the emission unit 18 of the VCSEL 17. In the X-axis direction, a center line Cl (FIG. 1B) of the cylindrical hole of the through hole 31 is positioned between the VCSEL 17 and the rotating mirror 21 of the MEMS optical deflector 20 in the X-axis direction. In the Z-axis direction, the center of the length of the inclination surface of the inclined groove 30 and the center line of the cylindrical hole of the through hole 31 are located at the same position, that is, at the same height from the substrate 15.

The plate-like mirror 23 is made of a rectangular plate-like member and has one end adhered to a slope portion of the inclined groove 30 in a cantilevered state with an adhesive member such as a resin with the lower plate surface thereof used as a mirror surface. The plate thickness of the plate-like mirror 23 is set substantially equal to the depth of the inclined groove 30.

The plate width (length in side view in FIG. 1B) of the plate-like mirror 23 is slightly shorter than the width (length in side view in FIG. 1B) of the inclined groove 30. Therefore, before one end of the plate-like mirror 23 is adhered to the inclined groove 30, that is, in a state before the one end is fixed, the plate-like mirror 23 is slightly displaceable in the direction of the slope of the bottom surface within the inclined groove 30 and is capable of changing the angle of rotation around the axial line parallel to the Y-axis. Such a change enables adjustment of the orientation of the mirror surface of the plate-like mirror 23 when manufacturing the optical scanning device 10.

The rotary type mirror 25 has a flat plate-like mirror portion 26 and a cylindrical fitting end portion 27 which is coupled to one end of the mirror portion 26 and fits into the through hole 31. The size (diameter) of the fitting end portion 27 is slightly smaller than the size of the through hole 31. Therefore, before adhesion of the fitting end portion 27 to the through hole 31, i.e., in a state before fixing thereof, the rotary type mirror 25 is rotatable about the center line Cl of the through hole 31 while fitting the fitting end portion 27 into the through hole 31, and can be tilted within a predetermined inclination angle range from a state in which the center line of the rotary type mirror 25 is aligned with the center line Cl of the through hole 31. Therefore, the rotary type mirror 25 is rotatably displaceable in a larger angle range than the plate-like mirror 23. Such a rotatable and tiltable configuration enables adjustment of the orientation of the mirror surface of the mirror portion 26 when the optical scanning device 10 is manufactured. After the adjustment, the fitting end portion 27 is adhered and fixed with an adhesive member such as a resin.

Figure 11:
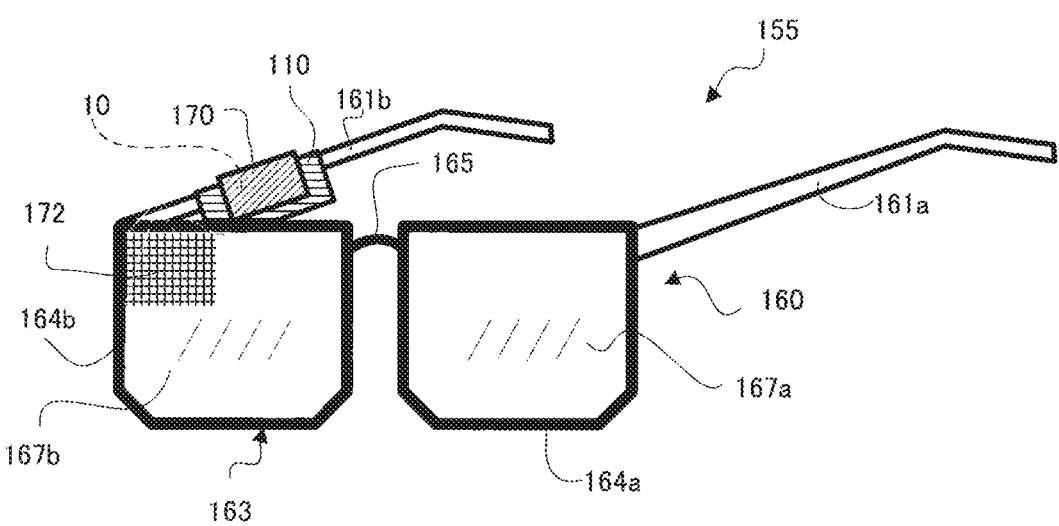
FIG. 11 is a view showing a spectacles-type video display device as an application example of the optical scanning device.

The rotating mirror 21 of the MEMS optical deflector 20 is not positioned directly below the rotary type mirror 25 with respect to the rotary type mirror 25 but is positioned on the front side, i.e., on the negative side with respect to the rotary type mirror 25 in the X-axis direction. As will be described later, this configuration contributes to causing a light beam Lp from the optical scanning device 10 to be emitted obliquely forward rather than perpendicular to the substrate 15 in regard to its emission direction. Further, this configuration ensures that when the optical scanning device 10 is attached to the temple of a spectacle body as a video scanning device of smart glasses, the light emitted from the optical scanning device 10 reaches the lens inner surface of the spectacle body without being interfered by the user's face from a slight gap between an imaging device and the user's face (FIG. 11).

Figures 3, 4A:
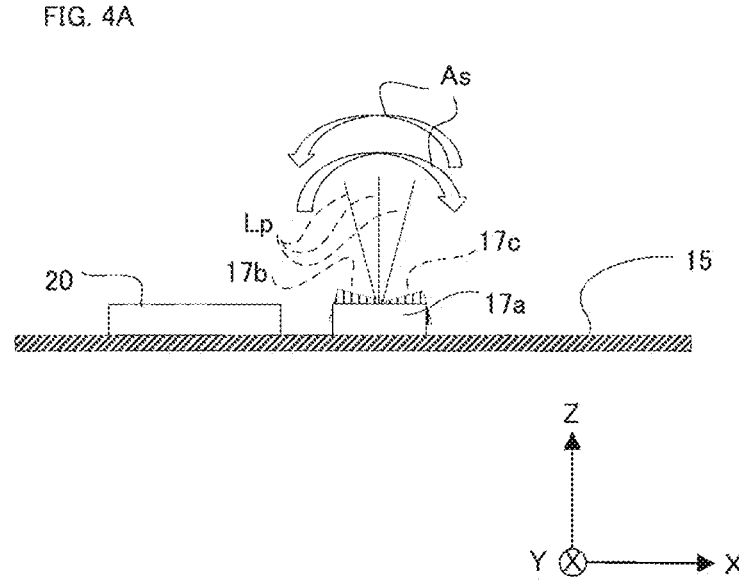
FIG. 3 is a perspective view of a protrusion mounted with a VCSEL as viewed obliquely from above.
FIG. 4A is an explanatory view of a problem when the VCSEL is slantingly mounted on a substrate.

FIG. 3 is a perspective view of the substrate 15 mounted with the VCSEL 17 as viewed obliquely from above. A terminal row module 39 is fixed onto the upper surface of the substrate 15 along a rear edge of the substrate 15 and protrudes from the upper surface of the substrate 15. Feeder lines and signal lines connected to the VCSEL 17 and the VCSEL 17 and the MEMS optical deflector 20 in the optical scanning device 10 are collected at inside terminals of the terminal row module 39 and connected to the outside via outside terminals which are in a relationship of being paired with the inside terminals. The terminal row module 39 protrudes from the upper surface of the substrate 15 by a predetermined height.

Description will be made in detail about the positions of the two columnar protruding portions 37. When the substrate 15 is in plan view (also viewed from above), the center line Cn is parallel to the uprising plate portion 13*b*. The MEMS optical deflector 20 is larger than the VCSEL 17 in size in the lateral direction (Y-axis direction) of the bottom plate portion 13*a* which is substantially rectangular in plan view.

The columnar protruding portion 37 on the front end side is positioned on the front side of the MEMS optical deflector 20 in the longitudinal direction (X-axis direction) of the bottom plate portion 13*a* and in vicinity of the side edge on the uprising plate portion 13*b* side in the lateral direction (Y-axis direction). The columnar protruding portion 37 on the rear end side is positioned on the side opposite to the columnar protruding portion 37 on the front end side with respect to the VCSEL 17 in the lateral direction between the VCSEL 17 and the terminal row module 39 in the longitudinal direction.

(Operation)

In FIG. 1B, a thick broken line from which Lp is drawn indicates the optical path of the light beam Lp. Incidentally, the light beam Lp emitted from the emission unit 18 of the VCSEL 17 is laser light that has been sufficiently weakened to a level which does not harm the human eyes.

The light beam Lp is emitted from the emission unit 18 of the VCSEL 17 perpendicularly to the substrate 15 and upward (positive direction in the Z-axis direction). When the light beam Lp enters the plate-like mirror 23, it is reflected by the plate-like mirror 23, and the direction thereof is changed to be parallel to the X-axis as the direction in which the VCSEL 17 and the emission unit 18 on the upper surface of the substrate 15 are arranged and to be the negative side of the X-axis. Then, after the light beam travels forward (negative side of the X-axis) parallel to the X-axis, the light beam enters the obliquely downward mirror surface of the mirror portion 26 of the rotary type mirror 25.

The inclination angle of the mirror portion 26 with respect to the substrate 15 is smaller than 45°. Therefore, the light beam Lp reflected by the mirror portion 26 descends obliquely forward without descending to the substrate 15 in parallel to the Z-axis direction, that is, in the direction perpendicular to the substrate 15, and enters the center of the rotating mirror 21 of the MEMS optical deflector 20.

The rotating mirror 21 rotates two-dimensionally. Therefore, the light beam Lp incident on the rotating mirror 21 becomes scanning light for two-dimensional scanning and travels obliquely forward and upward from the rotating mirror 21.

(Deviation in Emission Direction)

FIG. 4A is an explanatory view of deviations in the emission direction when the VCSEL 17 is mounted on the substrate 15 with an inclination. FIG. 4A illustrates VCSELs 17*a*, 17*b*, and 17*c* mounted on the substrate 15 at different angles as an example of mounting the VCSEL 17 on the substrate 15.

The VCSEL 17*a* is mounted on the substrate 15 so that the emission direction of the light beam Lp is the direction parallel to the Z-axis, whereas the VCSELs 17*b* and 17*c* are mounted on the substrate 15 so that the light beams Lp are inclined to the opposite sides mutually with respect to the VCSEL 17*a*. For this reason, the light beam Lp from the emission unit 18 is emitted vertically above the substrate 15, while the light beams are emitted from the VCSELs 17*b* and 17*c* in a direction inclined with respect to the Z-axis. That is, the mounting angle of the VCSEL 17 to the substrate 15 has errors and irregularities, and the direction of emission of the light beam Lp from the VCSEL 17 is displaced from directly above as indicated by arrows As.

Figure 4B:
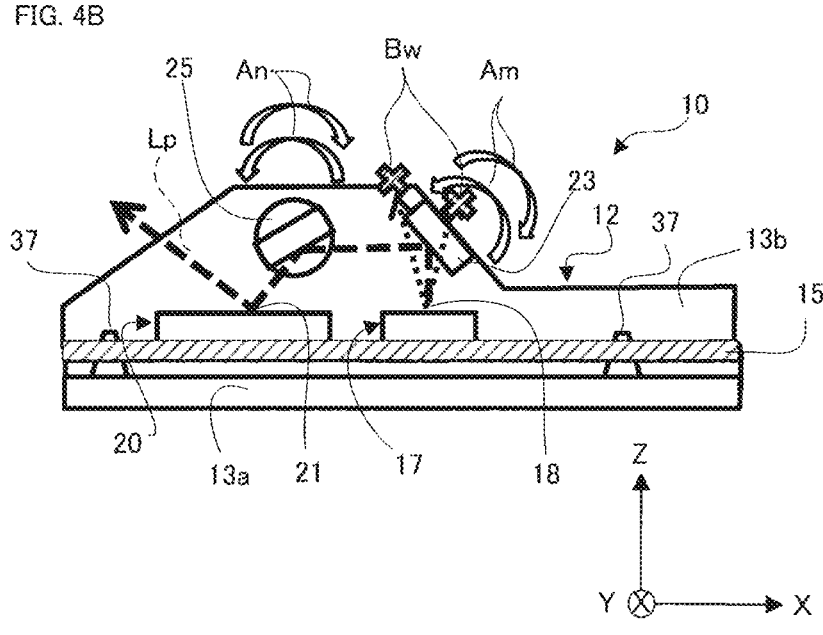
FIG. 4B is an explanatory view of compensation by adjusting the inclination angle of a plate-like mirror for an error or the like in the direction in which a light beam is emitted from an emission unit.

FIG. 4B is an explanatory view of compensation by adjusting the inclination angle of the plate-like mirror 23 with respect to the deviation in the emission direction of the light beam Lp from the emission unit 18. As will be described later, when the optical scanning device 10 is manufactured, the plate-like mirror 23 and the rotary type mirror 25 are adjusted in inclination angle whey they are assembled to the support frame body 12. However, there is a limit to a compensable range by adjustment of the inclination angle of the plate-like mirror 23 for the deviation in the direction in which the light beam Lp is emitted from the emission unit 18, and compensation for the deviation which exceeds the limit becomes difficult.

In FIG. 4B, an arrow Am indicates that the emission direction of the light beam Lp from the emission unit 18 of the VCSEL 17 has been displaced beyond a limit value from directly above. Bw indicates that adjusting the mounting angles of the plate-like mirror 23 and the rotary type mirror 25 with respect to the uprising plate portion 13*b* when the optical scanning device 10 is manufactured makes it difficult to compensate for the deviations in the direction of light-beam emission from the emission unit 18.

(Correction of Deviation in Emission Direction)

Figure 5A:
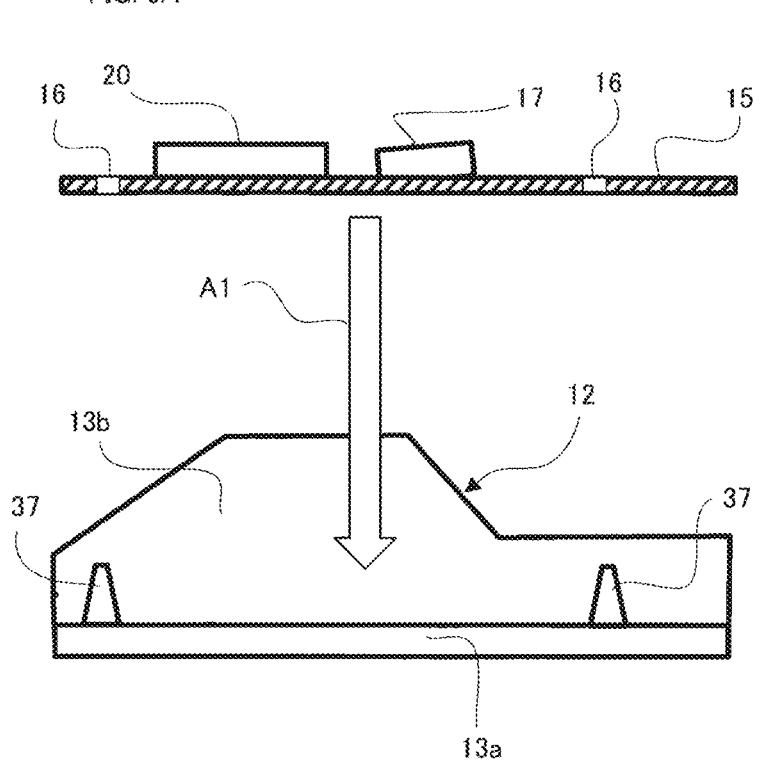
FIG. 5A is a view showing a step of assembling a substrate to a support frame body.

Main parts of a method for manufacturing the optical scanning device 10 will be described below in order of steps. FIG. 5A is a view showing a step of assembling the substrate 15 to the support frame body 12. In FIG. 5A, the VCSEL 17 and the MEMS optical deflector 20 have already been mounted on the substrate 15. The VCSEL 17 is inclinedly mounted on the substrate 15. This inclination is indicated by the arrow Am in FIG. 4B.

In FIG. 5A, an arrow A1 indicates the direction in which the substrate 15 is assembled to the bottom plate portion 13*a* of the support frame body 12. The substrate 15 is moved downward vertically to the bottom plate portion 13*a* from above the bottom plate portion 13*a*, that is, in the direction of the arrow A1 so that the columnar protruding portions 37 of the bottom plate portion 13*a* are inserted into the respective through hole portions 16.

Figure 5B:
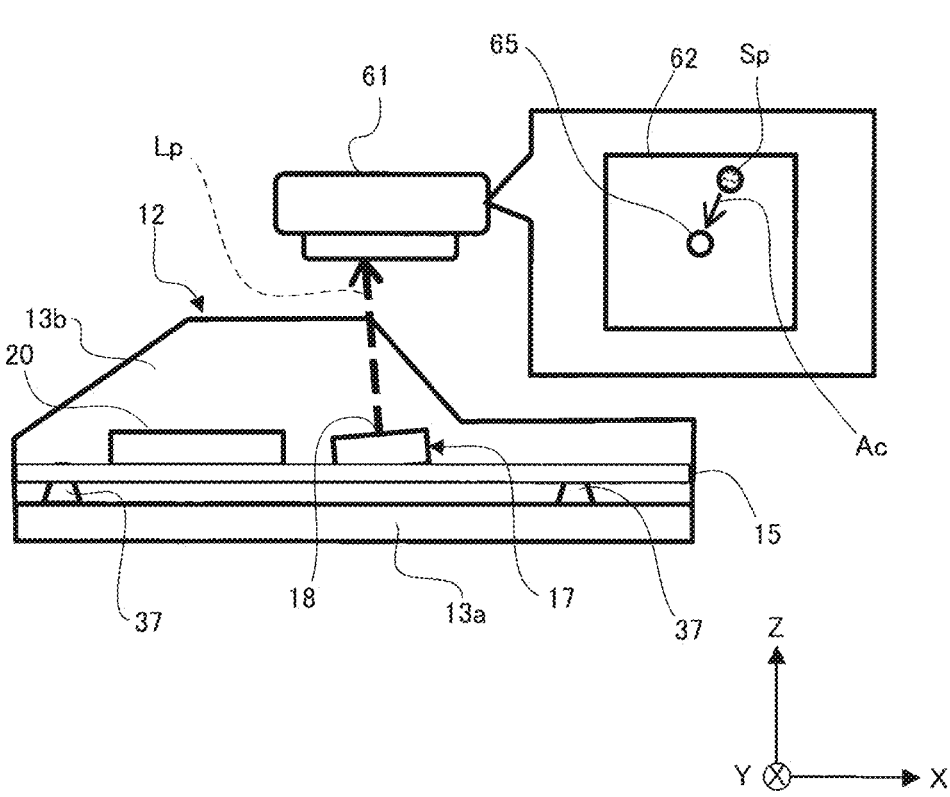
FIG. 5B is a state diagram when starting to adjust the inclination direction of the substrate with respect to a bottom plate portion.

FIG. 5B is a state diagram when starting to adjust the inclination direction of the substrate 15 with respect to the bottom plate portion 13*a*. After each columnar protruding portion 37 of the bottom plate portion 13*a* is inserted into the through hole portion 16, the VCSEL 17 is set to a lightening state to emit the light beam Lp from the emission unit 18. A beam profiler 61 is arranged above the VCSEL 17 and inspects the incident position of the light beam Lp emitted from the emission unit 18. That is, a light spot Sp is projected on a display 62 of the beam profiler 61. A target position 65 of the light spot Sp is shown in the center of the display 62. When the light beam Lp emitted from the emission unit 18 of the VCSEL 17 is vertically upward with respect to the bottom plate portion 13*a*, the light spot Sp overlaps the target position 65.

An adjustment operator adjusts the inclination angle of the substrate 15 with respect to the bottom plate portion 13*a* so that the light spot Sp moves in the direction of an arrow Ac on the display 62 and overlaps the target position 65.

The columnar protruding portion 37 has a conical shape which tapers toward the tip (upper end) as its original shape. On the other hand, the through hole portion 16 of the substrate 15 has a circular shape in plan view, that is, a circular cross-sectional shape. The diameter of a base (lower end) of the columnar protruding portion 37 is larger than diameter (diam) of the through hole portion 16.

Since the columnar protruding portion 37 has the tapered conical shape, the leading end of the columnar protruding portion 37 smoothly enters the through hole portion 16 from the lower end of the through hole portion 16. Then, a portion of the columnar protruding portion 37 having the same diameter as that of the through hole portion 16 abuts against the lower end of the through hole portion 16 and is blocked from further entry. Since the diameters of the plurality of through hole portions 16 are the same as each other, and the plurality of columnar protruding portions 37 are the same in size and shape, the substrate 15 becomes parallel to the bottom plate portion 13*a* when the columnar protruding portion 37 abuts against the lower end of the through hole portion 16 and is blocked from entering the through hole portion 16.

However, since the VCSEL 17 is not horizontal to the substrate 15 and is mounted thereon with inclination thereto, the light beam Lp emitted from the emission unit 18 has a considerable deviation with respect to the original emission direction in this state. Therefore, in a state (initial state) in which the through hole portion 16 of the substrate 15 is fitted with the columnar protruding portion 37 of the bottom plate portion 13*a* from below the through hole portion 16, the substrate 15 is parallel to the bottom plate portion 13*a*. However, when the light beam Lp emitted from the emission unit 18 of the VCSEL 17 is inspected by the beam profiler 61, the light spot Sp is displayed at a position distant from the target position 65 on the display 62.

Hereinafter, the plane of the substrate 15 when the substrate 15 is parallel to the bottom plate portion 13a as a base plate is referred to as a "reference plane". The reference plane is a plane parallel to the X-axis and the Y-axis. Incidentally, the bottom plate portion 13a fits into a lower opening of the cover 33 (FIG. 1B) at its peripheral edge to configure a package of the optical scanning device 10. In the initial state, the substrate 15 is in the reference plane.

(Correction of Deviation)

Figure 5C:
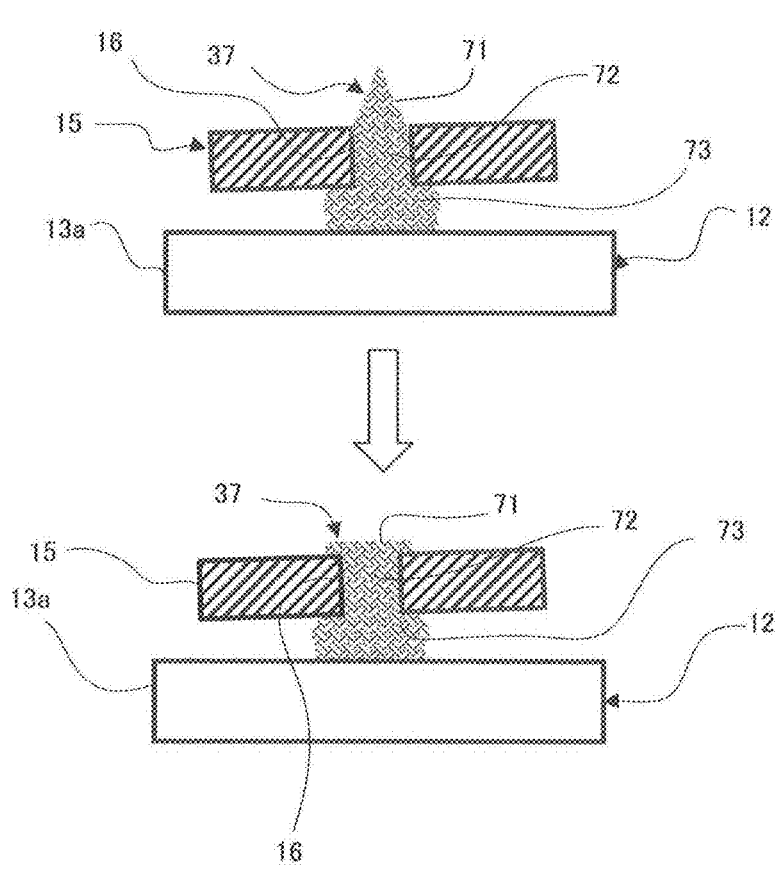
FIG. 5C is an explanatory view of the work of correcting the emission direction from the emission unit of the VCSEL.

FIG. 5C is an explanatory view of the work of correcting the emission direction from the emission unit 18 of the VCSEL 17. The substrate 15 is made of a material which is relatively harder than the columnar protruding portion 37. For example, the substrate 15 is of epoxy resin, and the columnar protruding portion 37 is of polyvinyl chloride. Also, the columnar protruding portion 37 is thermoplastic. Therefore, when the substrate 15 is strongly pushed toward the bottom plate portion 13a in a state in which the columnar protruding portion 37 is partially inserted into the through hole portion 16 of the substrate 15 on its tip side, a lower end portion 73 below the substrate 15 is plastically deformed. At this time, the columnar protruding portion 37 may be heated so as to be easily deformed. The heating is performed at a temperature of the degree that the material of the columnar protruding portion 37 is softened and other members are not deformed. The heating can be done with a hot plate.

The adjustment operator changes the inclination direction (including both the inclination angle and the direction of the slope) of the substrate 15 with respect to the reference plane. The change in the inclination direction can be realized by causing the adjustment operator to plastically deform the columnar protruding portion 37 through the use of a jig while pushing the through hole portion 16 toward the bottom plate portion 13a in a predetermined inclination direction. The predetermined inclination direction is the inclination direction in which the light spot Sp is moved in the direction of the arrow Ac on the display 62 of FIG. 5B.

In FIG. 5C, the columnar protruding portion 37 is divided into three parts of an upper end portion 71, a fitting portion 72, and a lower end portion 73. The fitting portion 72 is positioned within the through hole portion 16 and fitted into the through hole portion 16. The upper end portion 71 and the lower end portion 73 are located above and below the fitting portion 72, respectively, and are exposed above and below the substrate 15, respectively. The diameter of the lower end portion 73 is larger than that of the through hole portion 16, and the diameter of the fitting portion 72 is equal to or smaller than the diameter of the through hole portion 16. The diameter of the upper end portion 71 is equal to or smaller than the diameter of the through hole portion 16 and is smaller than the diameter of the through hole portion 16 at least at its upper end.

As the substrate 15 is pushed toward the bottom plate portion 13a in the through hole portion 16, the columnar protruding portion 37 is plastically deformed at the fitting portion 72 and the lower end portion 73. The inclination direction of the substrate 15 with respect to the reference plane is determined by the fitting angle between the through hole portion 16 and the fitting portion 72.

Figure 5D:
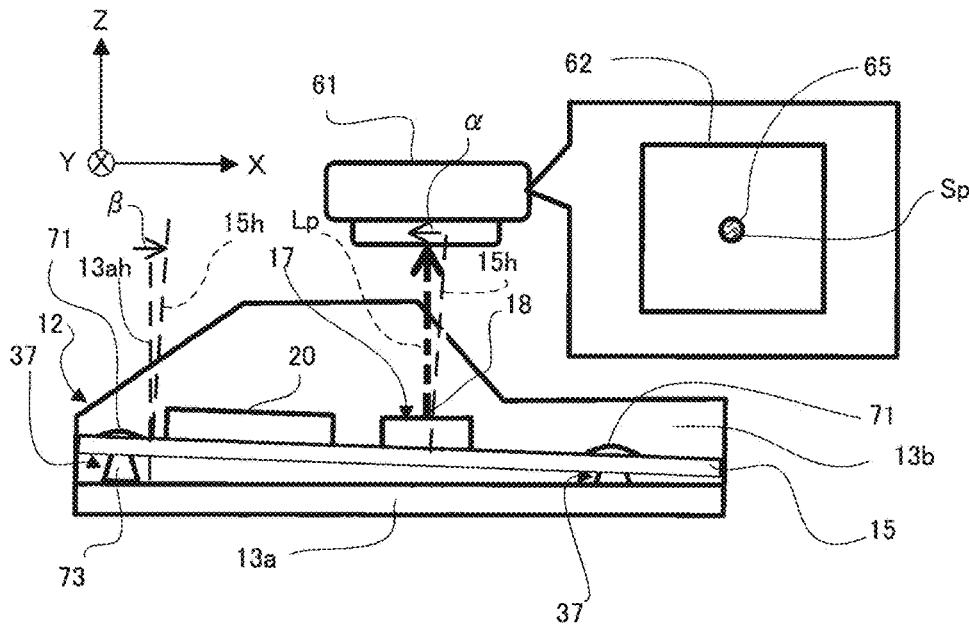
FIG. 5D is a state diagram when the adjustment of the inclination direction of the protrusion with respect to the bottom plate portion is completed.

FIG. 5D is a state diagram when the inclination direction of the substrate 15 with respect to the bottom plate portion 13a is completed in its adjustment. When the light spot Sp overlaps the target position 65 on the display 62, the work of adjusting it is completed.

Since a direction β in which a normal line 15h of the substrate 15 inclines with respect to a normal line 13ah of the bottom plate portion 13a is opposite to a direction α in which the light beam Lp inclines with respect to the normal line 15h of the substrate 15, the deviation of the light beam Lp is improved. Further, since the inclination angle of the light beam Lp with respect to the normal line 15h of the substrate 15 and the inclination angle of the normal line 15h of the substrate 15 with respect to the normal line 13ah of the bottom plate portion 13a are the same, the light beam Lp becomes perpendicular to the bottom plate portion 13a.

Further, the bottom plate portion 13a and the uprising plate portion 13b are integral members, and the plate-like mirror 23 and the rotary type mirror 25 fixed to the uprising plate portion 13b have a positional relationship with the bottom plate portion 13a, which does not change due to the inclination of the substrate 15. That is, in the present invention, the positional relationship between the light beam Lp, the plate-like mirror 23, and the rotary type mirror 25 is guaranteed with the bottom plate portion 13a as a reference.

Incidentally, although the inclination of the substrate 15 with respect to the bottom plate portion 13a when viewed from Y direction is illustrated in FIG. 5D, the substrate 15 is inclined with respect to the bottom plate portion 13a even when viewed from the X direction simultaneously.

After that, the substrate 15 and the columnar protruding portion 37 are fixed to each other by bonding, welding, or by expanding the diameter of the upper end portion 71 in a state in which the substrate 15 is unbalanced, i.e., inclined with respect to the bottom plate portion 13a. In the case of welding, the columnar protruding portion 37 needs to have heat fusibility. FIGS. 5A to 5D show a state in which the upper end portion 71 is expanded in diameter. The upper end portion 71 is plastically deformed to a diameter larger than the diameter of the through hole portion 16 by being crushed from above, and is fixed to the upper surface of the substrate 15.

Figure 6:
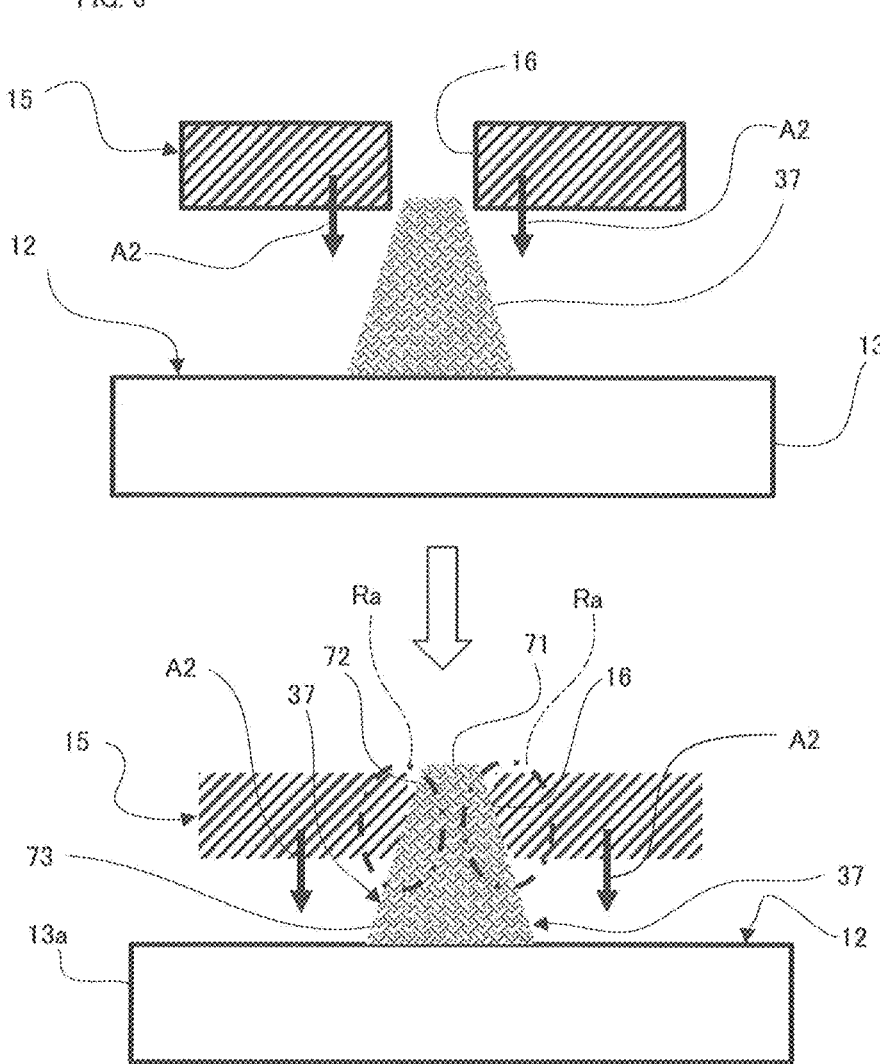
FIG. 6 is an explanatory view of the work of correcting the emission direction from the emission unit of the VCSEL in a manner different from that of FIG. 5C.

FIG. 6 is an explanatory view of the work of correcting the emission direction from the emission unit 18 of the VCSEL 17 in a manner different from that of FIG. 5C. In the case of FIG. 6, contrary to the case in FIG. 5C, the columnar protruding portion 37 is made of a material which is relatively harder than the substrate 15. For example, epoxy resin can be selected for the substrate 15, and iron or brass can be selected for the columnar protruding portion 37. Therefore, the substrate 15 is strongly pushed toward the bottom plate portion 13a in the direction of an arrow A2 in a state in which the columnar protruding portion 37 is partially inserted into the through hole portion 16 of the substrate 15 on its distal end side.

Thus, as shown within a range Ra in a lower diagram of FIG. 6, the columnar protruding portion 37 retains the shape of the original cone or truncated cone, while the fitting portion 72 of the columnar protruding portion 37 is radially crushed by plastic deformation. As a result, the shape of the columnar protruding portion 37 and the shape of the fitting portion 72 become the same. Further, the upper end surface of the lower end portion 73 forms a plane protruding radially from the through hole portion 16 and supports the substrate 15.

The inclination direction of the substrate 15 with respect to the reference plane is determined by the fitting angle between the through hole portion 16 and the fitting portion 72. In subsequent processing, as in the case of FIG. 5C, the substrate 15 and the columnar protruding portion 37 are fixed to each other by adhesion, welding, or by enlarging the diameter of the upper end portion 71.

(Adjustment of Optical Path Generating Mirror)

Figure 7A:
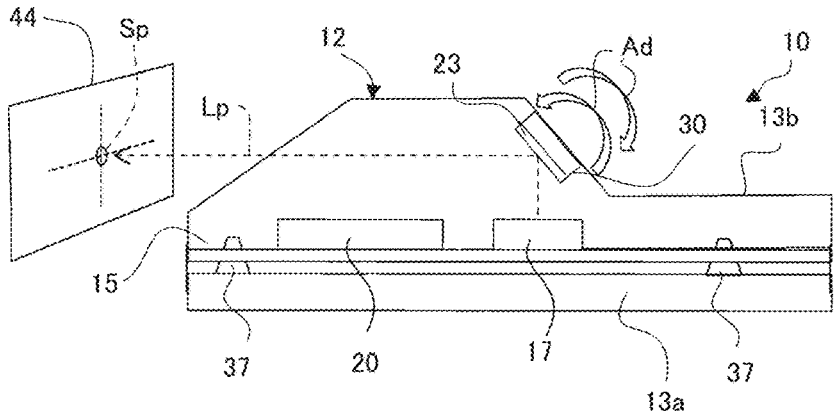
FIG. 7A is an explanatory view of the work of adjusting an inclination angle when assembling the plate-like mirror to an uprising plate portion.
Figure 7B:
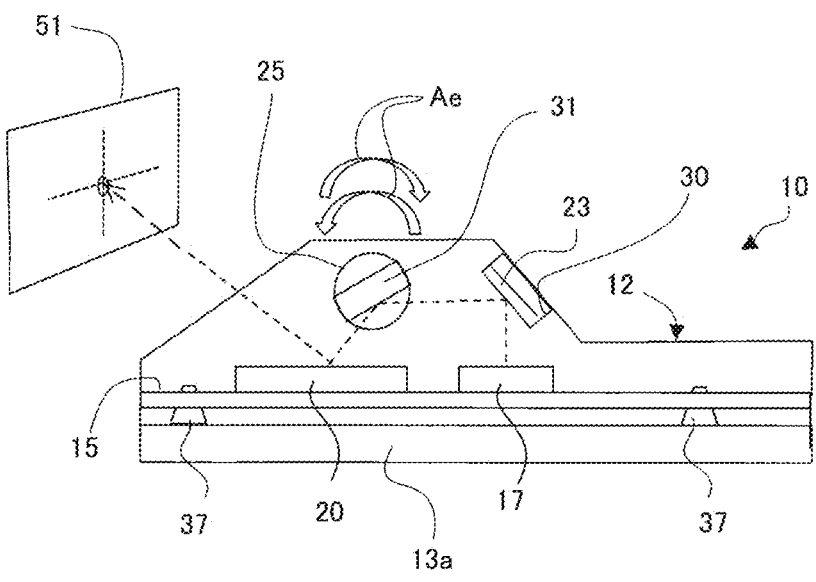
FIG. 7B is an explanatory view of the work of adjusting an inclination angle when a rotary type mirror is assembled to the uprising plate portion.

The plate-like mirror 23 and the rotary type mirror 25 are assembled to the uprising plate portion 13b after adjusting the inclination direction of the substrate 15 with respect to the reference plane. The plate-like mirror 23 and the rotary type mirror 25 are optical elements which generate an optical path for causing the light beam Lp emitted from the VCSEL 17 to enter the rotating mirror 21 of the MEMS optical deflector 20. Therefore, it is necessary to assemble both mirrors to the uprising plate portion 13b at a proper inclination angle so that a proper optical path is generated. FIGS. 7A and 7B are explanatory views of the work of adjusting the inclination angle when assembling the plate-like mirror 23 and the rotary type mirror 25 to the uprising plate portion 13b, respectively.

The inclination angle of the plate-like mirror 23 is such that the plate-like mirror 23 is rotated in the direction of an arrow Ad within the inclined groove 30 so that the VCSEL 17 is turned on and the light beam Lp reflected by the plate-like mirror 23 generates a light spot Sp at a reference position of a predetermined screen 44. When the light spot Sp as the irradiation position of the light beam Lp on the screen 44 reaches the reference position, the plate-like mirror 23 is fixed to the inclined groove 30 by adhesion or the like.

The assembly of the rotary type mirror 25 to the uprising plate portion 13b is performed after the assembly of the plate-like mirror 23 to the uprising plate mirror 13b. The inclination angle of the rotary type mirror 25 is such that the plate-like mirror 23 is rotated in the direction of an arrow Ae within the through hole 31 so that the VCSEL 17 is turned on and the light beam Lp reflected in the order of the plate-like mirror 23, the rotary type mirror 25, and the rotating mirror 21 of the MEMS optical deflector 20 generates a light spot Sp at a reference position of a predetermined screen 51. When the light spot Sp as the irradiation position of the light beam Lp on the screen 51 reaches the reference position, the rotary type mirror 25 is fixed to the screen 51 by adhesion or the like.

(Another Embodiment)

Figure 8A:
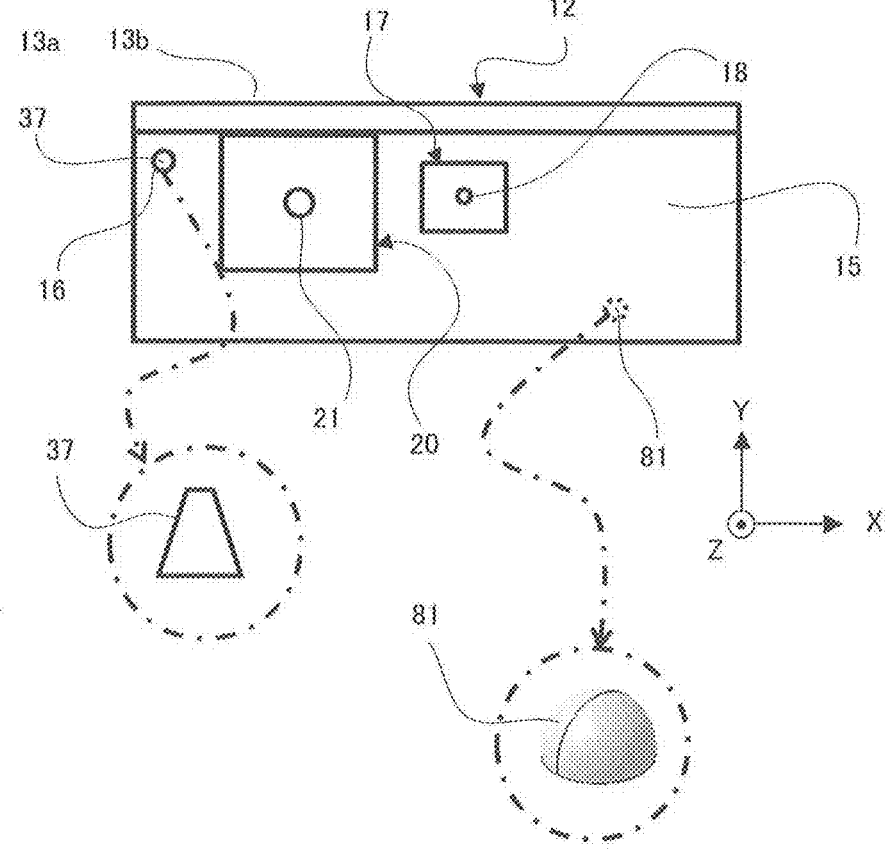
FIG. 8A is a structural view of adjusting the inclination direction of a substrate by one columnar protruding portion.

FIG. 8A is a structural view of adjusting an inclination direction of a substrate 15 by one columnar protruding portion 37. In FIG. 1B, the two columnar protruding portions 37 are provided, but in FIG. 8A, one of the two columnar protruding portions 37 (the columnar protruding portion 37 on the rear side in this example) is replaced by a bulging portion 81 at the same position. Accordingly, the substrate 15 has only one through hole portion 16.

The bulging portion 81 is formed with a convex curved surface, e.g., a hemispherical surface. The amount of protrusion thereof from a bottom plate portion 13a is higher in the columnar protruding portion 37 than in the bulging portion 81.

Figure 8B:
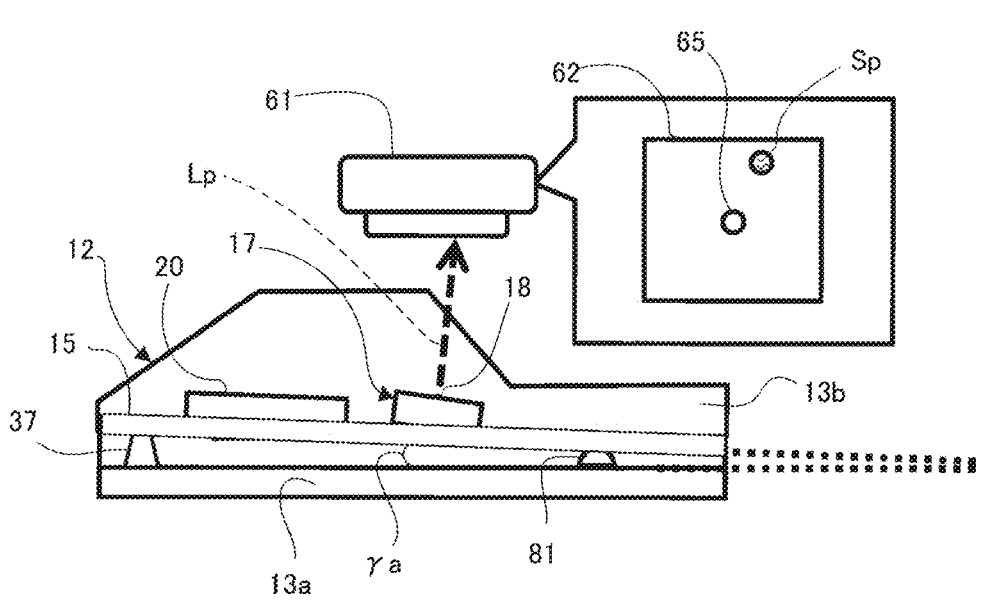
FIG. 8B illustrates a situation when adjusting the inclination direction of a protrusion with respect to the configuration of FIG. 8A.

FIG. 8B shows a situation when adjusting the inclination direction of the substrate 15 with respect to the configuration of FIG. 8A. In the initial state of the substrate 15 before adjustment of the inclination direction, unlike FIG. 5B, the substrate 15 is not parallel to the bottom plate portion 13a but descends toward the rear end side at an inclination angle γa. Further, in the initial state, the direction of emission of a light beam Lp is inclined at a predetermined angle from the vertical direction with respect to the bottom plate portion 13a. Therefore, a light spot Sp is separated from a target position 65 on a display 62.

The adjustment operator pushes the front end side of the substrate 15, i.e., the side of the columnar protruding portion 37 downward. Consequently, the columnar protruding portion 37 is plastically deformed as described in FIG. 5C, and hence the inclination direction of the substrate 15 is adjusted to an appropriate value. That is, the light spot Sp overlaps the target position 65 on the display 62 of FIG. 8B.

Even when one columnar protruding portion 37 is provided, as in FIG. 6, the through hole portion 16 side is plastically deformed to change a fitting angle between the through hole portion 16 and the columnar protruding portion 37, so that a desired inclination direction can be obtained.

Figure 9:
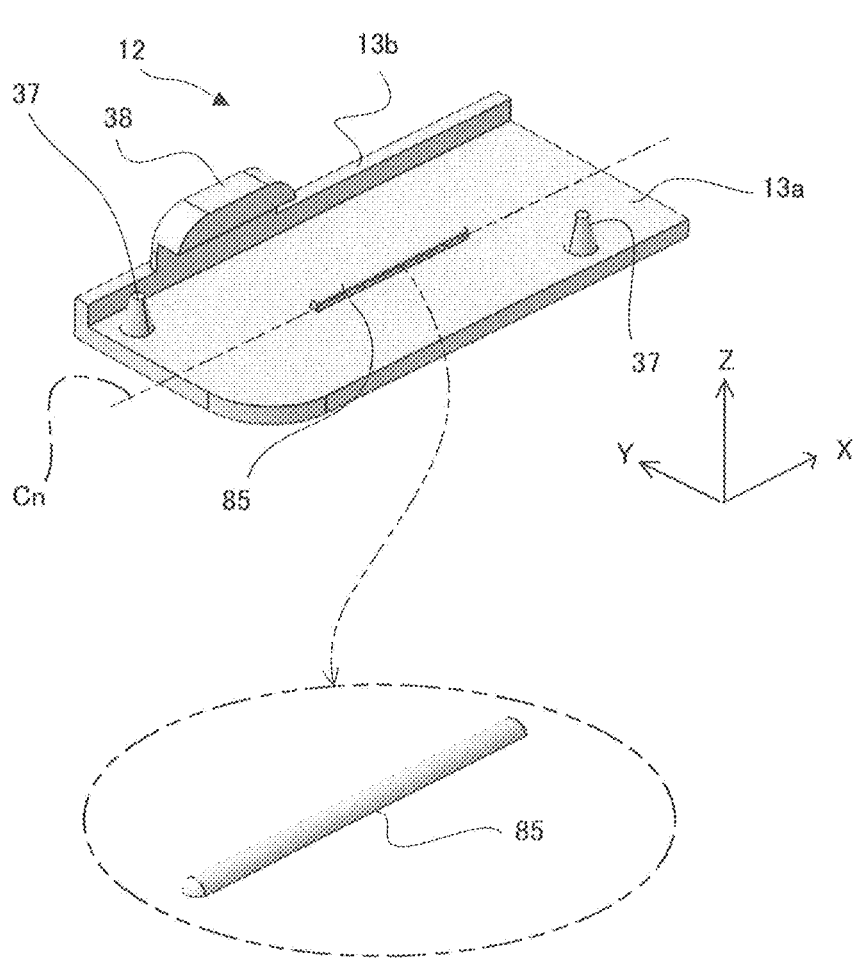
FIG. 9 is a perspective view of a support frame body with a protrusion added to an upper surface of a bottom plate portion.
Figure 10:
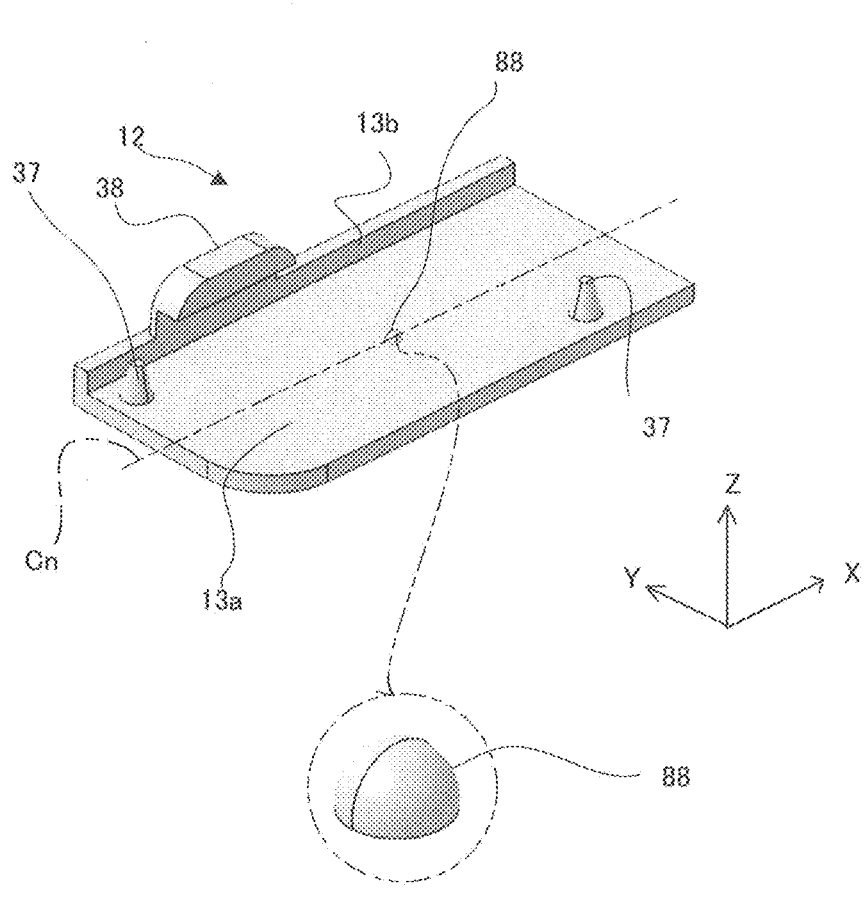
FIG. 10 is a perspective view of a support frame body with a bulging portion added to an upper surface of a bottom plate portion.

FIGS. 9 and 10 are perspective views of support frame bodies 12 having a protrusion 85 and a bulging portion 88 each added to an upper surface of a bottom plate portion 13a. Description will be made about only differences from FIG. 2B already described. The protrusion 85 and the bulging portion 88 are both located on a center line Cn. The center line Cn is as defined in FIG. 1A. Further, the bulging portion 88 is located at the intersection of a line segment connecting the two columnar protruding portions 37 and the center line Cn in top view.

The heights of the protrusion 85 and the bulging portion 88 from the bottom plate portion 13a are lower than the height of the columnar protruding portion 37 in the initial state. The protrusion 85 and the bulging portion 88 are not plastically deformed. The two columnar protruding portions 37 are then plastically deformed by adjusting the inclination direction of the substrate 15 with respect to the bottom plate portion 13a. The heights of the two columnar protruding portions 37 after the plastic deformation are such that one columnar protruding portion 37 is higher in height than the protrusion 85 and the bulging portion 88, and the other columnar protruding portion 37 is lower in height than the protrusion 85 and the bulging portion 88. Consequently, the lower surface of the substrate 15 contacts the protrusion 85 or the bulging portion 88. The protrusion 85 and the bulging portion 88 have a role of stabilizing the inclination direction of the substrate 15.

(Example of Application of Optical Scanning Device)

FIG. 11 is a view showing a spectacles-type video display device 155 as an application example of the optical scanning device 10. The spectacles-type video display device 155 will be briefly described. The spectacles-type video display device 155 includes a spectacle body 160 and a video generation device 110 detachably attached to the spectacle body 160 by a clip 170. The spectacle body 160 includes left and right temples 161a and 161b and a front frame 163 coupled to front ends of the left and right temples 161a and 161b at both left and right ends. The front frame 163 further includes left and right lens frame portions 164a and 164b, and a bridge 165 connecting the left and right lens frame portions 164a and 164b.

The optical scanning device 10 is incorporated in one-row arrangement within the video generation device 110 together with other elements (for example: buffer amplifier for MEMS sensor and LDD (laser driver)) along the extension direction of the temple 161b of the spectacle body 160. Incidentally, in this one-row arrangement, the optical scanning device 10 is arranged in the forefront, that is, closest to the lenses 167a and 167b. Thus, the light beam Lp (FIG. 2B) emitted from the optical scanning device 10 irradiates the inner surface side of the lens 167b to generate an image in a scanning area 172.

(Modification)

The optical scanning device 10 includes a VCSEL 17. The VCSEL 17 is an example of a surface emitting laser element. The present invention can adopt a laser light source other than a vertical cavity surface emitting laser (VCSEL) as long as it is of the surface emitting laser element.

The optical scanning device of the present invention can be applied not only as a video generation device for smart glasses, but also as a vide generation device for an ultra-compact projector and an interactive projector.

In the optical scanning device 10, the fitting angle between the through hole portion 16 and the columnar protruding portion 37, which defines the relative inclination angle between the substrate 15 and the bottom plate portion 13a is defined by mutual fitting by either one of the plastic deformation (FIG. 5C) of the upper portion of the columnar protruding portion 37 and the plastic deformation (FIG. 6) of the through hole portion 16. In the optical scanning device of the present invention, it is sufficient if mutual fitting by at least one plastic deformation is taken. That is, it does not exclude mutual fitting by both plastic deformations.

In the optical scanning device 10, the bottom plate portion 13a as the bottom plate of the present invention is coupled to the uprising plate portion 13b as a part of the support frame body 12. The bottom plate of the present invention may be a single component.

In the optical scanning device 10, the plate-like mirror 23 and the rotary type mirror 25 serve as optical elements which generate an optical path for causing the light beam Lp emitted from the VCSEL 17 as a light source to enter the rotating mirror 21 of the MEMS optical deflector 20. The optical element of the present invention may be a prism or the like other than a mirror.

In the optical scanning device 10, the columnar protruding portion 37 has an upper end portion 71 and a fitting portion 72 (FIGS. 5 and 6) as upper portions with respect to its lower end coupled to the bottom plate portion 13a. The columnar protruding portion of the present invention only needs to have the fitting portion 72 as the upper portion, and the portion above the substrate (for example: the upper end portion 71) may be omitted. Incidentally, in the absence of the upper end portion 71, it is difficult to mutually fix the bottom plate portion 13a and the substrate 15 by the enlarged diameter portion (e.g., the upper end portion 71 in FIG. 5D) or by welding, but mutual fixing by adhesion is possible.

In the optical scanning device 10, the center line Cn extends in the longitudinal direction of the substrate 15. The center line Cn may be inclined with respect to the longitudinal direction.

In the optical scanning device 10, the VCSEL 17 is smaller than the MEMS optical deflector 20 in size in the lateral direction. Then, the arrangement direction as a line segment connecting the emission unit 18 as the center of the VCSEL 17 and the center of the MEMS optical deflector 20 extends in the longitudinal direction of the substrate 15. Therefore, when two through hole portions 16 are provided, they are fixed to the bottom plate in a positional relationship in which when viewed from the top of the substrate 15, they are arranged on one side and the other side in the longitudinal direction respectively with respect to a mounting area including the VCSEL 17 and the MEMS optical deflector 20 in the substrate 15, and are arranged on one side and the other side in the lateral direction respectively with respect to the VCSEL 17. This is because the fitting angle between the through hole portion 16 and the columnar protruding portion 37 at such a position stabilizes the regulation of the relative inclination angle between the substrate 15 and the bottom plate portion 13a.

The optical scanning device 10 has one or two columnar protruding portions 37. The optical scanning device of the present invention may have three or more columnar protruding portions 37.

The target position 65 in FIG. 5D is an example of the target position of the light spot Sp as the irradiation point of the light beam Lp on the display 62 as the screen. In this example, the size of the target position 65 is the same as the size of the light spot Sp, but can be made larger than the size of the light spot Sp as a predetermined area when the deviation in the emission direction of the light beam Lp falls within a correctable limit.

Further, when the light spot Sp falls inside the predetermined area being the target position 65, it can be recognized that the adjustment has been completed.

DESCRIPTION OF REFERENCE NUMERALS

10 . . . optical scanning device
13a . . . bottom plate portion
15 . . . substrate
16 . . . through hole portion
17 . . . VCSEL
20 . . . MEMS optical deflector
21 . . . rotating mirror
23 . . . plate-like mirror
25 . . . rotary type mirror
37 . . . columnar protruding portion
71 . . . upper end portion
72 . . . fitting portion
73 . . . lower end portion
81, 86 . . . bulging portion
85 . . . protrusion

The invention claimed is:

1. An optical scanning device, comprising:
a substrate having at least one through hole portion;
a light source and a MEMS optical deflector mounted on the substrate;
an optical element generating an optical path which causes a light beam emitted from the light source to enter the MEMS optical deflector;
a bottom plate arranged below the substrate; and
a columnar protruding portion having a lower end larger in size than a through hole of the through hole portion and fixed to an upper surface of the bottom plate in a shape tapered toward a tip of the columnar protruding portion, and having an upper portion fitted into the through hole portion,
wherein at least one of the upper portion of the columnar protruding portion and the through hole portion is plastically deformed so that the two are fitted to each other, and
wherein a relative inclination angle between the substrate and the bottom plate is defined by a fitting angle between the through hole portion and the columnar protruding portion.

2. The optical scanning device according to claim 1, wherein the bottom plate includes one bulging portion having a convex curved surface at a position apart from the columnar protruding portion in at least the direction in which the light source and the MEMS optical deflector are arranged, and
wherein a lower surface of the substrate is in contact with the bulging portion with the lower surface pressed against the bulging portion.

3. The optical scanning device according to claim 1, wherein the at least two through hole portions are used,
wherein the direction in which the light source and the MEMS optical deflector are arranged on the substrate is a longitudinal direction of the substrate,
wherein when viewed from the top of the substrate, the through holes of the two through hole portions are fixed to the bottom plate in a positional relationship in which the through holes are arranged on one side and the other side respectively in the longitudinal direction with respect to a mounting area including the light source and the MEMS optical deflector in the substrate, and are arranged on one side and the other side respectively in the lateral direction with respect to the light source.

4. The optical scanning device according to claim 3, wherein the bottom plate has a protrusion extending across a line segment which connects the two columnar protruding portions.

5. The optical scanning device according to claim 3, wherein the bottom plate has a spherical protruding portion on a line segment connecting the two columnar protruding portions.

6. The optical scanning device according to claim 1, further including an uprising plate which is coupled to the bottom plate and rises from the bottom plate, wherein the optical element is a mirror fixed to the uprising plate.

7. A method for manufacturing an optical scanning device, comprising:

an arrangement step of arranging a bottom plate having a columnar protruding portion tapered toward an upper end of the columnar protruding portion, which is fixed to an upper surface of the bottom plate in association with each through hole, on the lower side of a substrate having at least one through hole portion and mounted on the upper surface side of the substrate with a light source and a MEMS optical deflector;

an insertion step of inserting each columnar protruding portion of the bottom plate into each through hole of the substrate from below;

an irradiation step of turning on the light source and generating an irradiation point of a light beam emitted from the light source on a predetermined screen;

an adjustment step of plastically deforming at least one of the through hole portion and the columnar protruding portion to adjust a relative inclination angle between the substrate and the bottom plate so that the irradiation point falls inside a predetermined area on the screen; and a step of, when the irradiation point falls inside a predetermined area on the screen, fixing the substrate to the bottom plate at a relative inclination angle at that time.

\*     \*     \*     \*     \*